Figure 1:
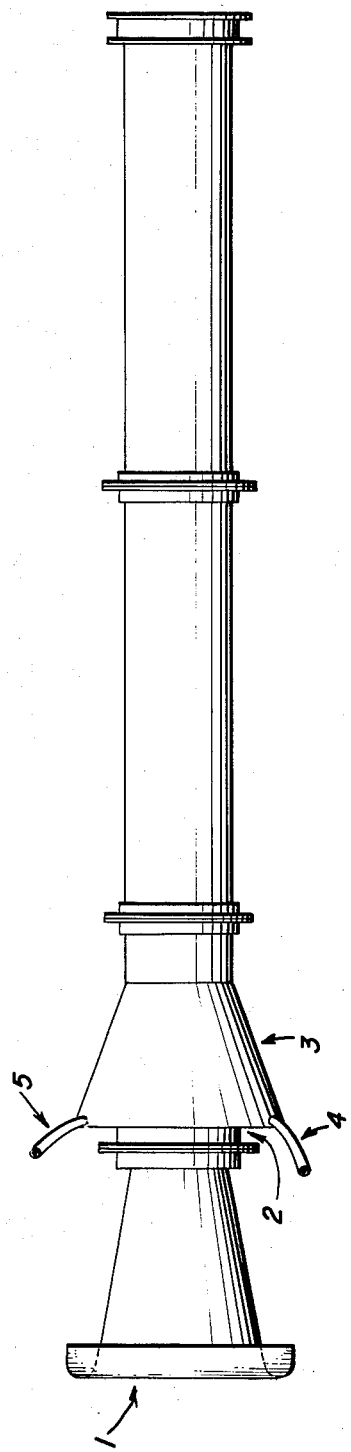

March 8, 1966  H. A. REMMERT  3,238,669
DEFOLIATING APPARATUS
Filed March 6, 1963  2 Sheets-Sheet 1

Herman A. Remmert
INVENTOR

March 8, 1966 H. A. REMMERT 3,238,669
DEFOLIATING APPARATUS
Filed March 6, 1963 2 Sheets-Sheet 2

Herman A. Remmert
INVENTOR

United States Patent Office 3,238,669
Patented Mar. 8, 1966

3,238,669
DEFOLIATING APPARATUS
Herman A. Remmert, Memphis, Tenn., assignor to W. R. Grace & Co., New York, N.Y., a corporation of Connecticut
Filed Mar. 6, 1963, Ser. No. 263,324
1 Claim. (Cl. 47—1.7)

This invention relates to the treatment of living plants. In one specific aspect it relates to the chemically induced defoliation of row crops before harvesting.

In summary, this invention involves an improvement in the known method of defoliating row crops with ammonia by moving a conventional elongated contacting zone, or hood, having a flared mouth for deflecting plants into the hood, lengthwise along the crop row while feeding ammonia to the system through ports. The improvement constituting my invention comprises placing a flared or "expanded" section, which is both higher and wider than the body section, immediately behind the mouth section of the contacting zone and locating the ammonia ports in the "expanded" section.

This invention results in much improved contact of ammonia with the plant leaves, thereby decreasing the ammonia required for a given degree of defoliation, as will now be explained.

Since many row crops, including cotton, corn, and milo, may be six feet or more in height, there is considerable compaction of the plants within the hood. Compaction is especially severe in the case of cotton, because cotton plants are both tall and wide. Furthermore, these plants have many leaves growing on branches near the center of the plants. When using hoods of conventional design, this compaction becomes so severe that it is difficult for ammonia vapor to diffuse throughout the entire leaf area during the short interval (ca. 2–4 seconds) that the plants are in the hood. This results in incomplete defoliation. When the expanded section, with ammonia ports placed therein, is located immediately behind the mouth of the hood, the compressed plants open momentarily in the immediate proximity of the ammonia ports. This opening of the compressed plants facilitates the diffusion of ammonia into the leaf area and thereby enhances defoliation. The entry of wind into the hood and the escape of ammonia from the front of the elongated contacting zone are minimized when the ammonia ports are placed in the hood body, because plants entering the contacting zone are compressed in the rear portion of the mouth thereby constituting a vapor barrier. Minimizing the escape of ammonia is essential, because it has been found that escaping ammonia contacting plants in adjacent rows, shocks them, and closes their stomata thereby rendering the shocked plants insensitive to defoliation on subsequent treatment with amonia in the contacting zone. With the apparatus of my invention, substantially complete defoliation has been obtained with ammonia feed rates ranging from about 40–120 pounds per acre, as compared to 150–300 pounds per acre needed with ammonia defoliator equipment of the prior art which lacked the expanded section with ammonia ports located therein of this invention.

Figure 2:
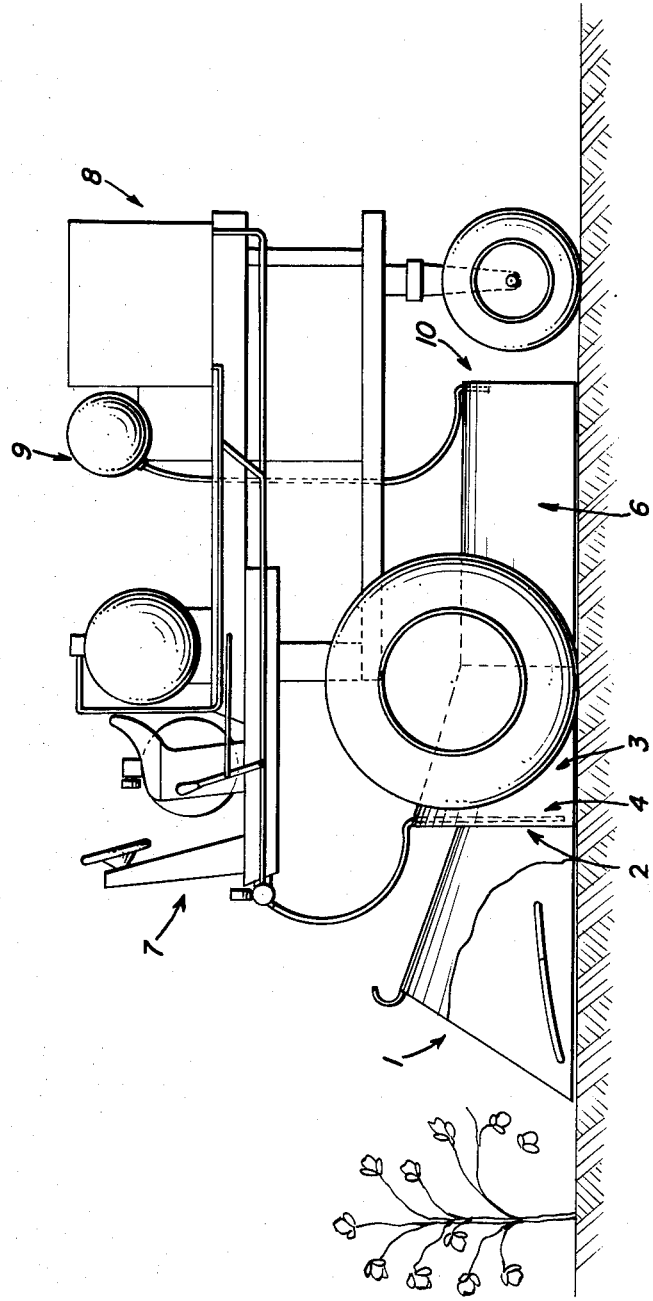

In the drawings:
FIGURE 1 is a top view of my improved elongated contacting zone.
FIGURE 2 shows the improved elongated contacting zone mounted upon a tractor.

Preferred embodiments of my invention include the use of ammonia feed rates ranging from about 60–90 pounds per acre while moving the contacting zone along the crop row at a speed of about 3–4 miles per hour. A water sprayer at the exit end of the contacting zone has been found desirable because it prevents the escape of unused ammonia into the atmosphere where the escaping ammonia may close stomata of plants in adjacent rows. As shown in FIG. 1 water spray means can be positioned directly in the top portion of the exit terminal of the body section of the hood. This is especially true when ammonia feed rates in excess of 100 pound per acre are used.

The advantages of my invention are best understood when considered with the rationale and current status of chemical defoliation.

Leaves on the stalks of row crops and on weeds growing with these crops are a handicap to harvesting, because leaves and leaf juices interfere with the functioning of mechanical harvesters and cause the accumulation of trash in the harvested crops. As a result, considerable interest has developed in the defoliation of row crops before harvesting. Defoliation of cotton has received the most attention with the result that cotton defoliation has become a matter of great economic importance. The defoliation of other row crops, especially soy beans—including weeds growing in the bean fields—is receiving increased attention.

In the commercial growing of cotton it has beeen necessary to make several pickings by hand, because all the bolls do not ripen at the same time. Bolls on the lower branches mature first, and opening of bolls on the upper branches occurs over a period of several weeks after the lower bolls have matured. In recent years, the shortage and cost of labor and the trend toward large scale farming have made mechanical picking very desirable. The presence of leaves on cotton stalks is an especially severe handicap to mechanical harvesting, because leaves present a barrier which hampers the picking means from reaching the bolls and add trash to the cotton. Also, if green leaves are rubbed against the cotton, juices are exuded and stain the cotton fibers. Thus, it is highly desirable that the leaves be removed from cotton plants before harvesting the crop mechanically.

If the leaves of a plant are injured by physical or chemical means, or if they are cut leaving stems, abscission layers of cells grow across the petiole bases causing the leaves or leaf stems to drop off. In the case of cotton, the formation of abscission layers disrupts the metabolic processes of the plants and causes the upper bolls to ripen and open more rapidly, thereby facilitating the use of mechanical pickers.

Although cotton defoliation is of special value when mechanical pickers are used, it also aids hand picking because the dew dries out quicker permitting the pickers to get an earlier start, and it is easier for the pickers to locate the bolls and gather the cotton when the plants are free of leaves.

Leaf removal also helps control the insect count. This is particularly true in respect to aphids, leafworms, and boll weevils. Since defoliation speeds up cotton harvesting, the stalks can be destroyed earlier. This is advantageous in areas that have plow-up programs to aid in the control of boll worms, and boll weevils.

To obtain the best results with cotton, the boll load should be heavy and vegetative development stopped. Normally, about 50%–70% of the bolls should open before a chemical defoliant is applied. Little damage to the crop will occur if most of the bolls are full size and firm to the touch at the time of defoliation. If the bolls are not full size and are soft when the plants are defoliated, the yield will be reduced and seed and fiber quality will be lowered.

At the present time most defoliants are contact herbicides which cause defoliation when applied at low rates. At slightly higher rates these materials produced rapid desiccation and killing of leaves, stems, and other plant parts before the abscission layers form. Desiccation is very objectionable with cotton, because leaves of dead plants set so firmly that few of them drop, boll development ceases, abscission of the bolls occurs, and the plant stems become brittle so that bolls are easily broken off and lost during harvesting. When legumes are desiccated, large numbers of seed pods drop off. Cyanamide compounds, organic phosphorus compounds, arsenic compounds, and chlorates are the principal defoliants used at the present time. Cyanamide is difficult to use because it requires a considerable amount of dew or other moisture. Practically no defoliation occurs when this material is applied in the absence of moisture. Arsenic and phosphorus compounds are poisonous, and chlorates leave phytotoxic residues in the soil. Furthermore, irregular defoliation is obtained with these materials, and defoliation is seldom more than about 60%–75% complete. There is known the treatment of cotton plants with hot combustion gasses to produce defoliation. A process of this type is extremely difficult to use, because the temperature must be controlled very closely. If the gas is too cool, little or no defoliation will be obtained; if it is too hot, desiccation or boll abscission will result. Various devices have been suggested for mechanically removing foliage from cotton plants. Although the use of such devices increases the efficiency of cotton picking to a limited extent, only partial defoliation has been obtained with these machines.

It is an object of the present invention to provide a means for defoliating row crops such as cotton, soy beans, corn, milo and the like after the crop is made, whereby the plants and weeds growing with them will be rendered substantially free of leaves so that the crops may be harvested mechanically or by hand to yield products that contain little trash and are free of leaf strain.

It has recently been discovered that contact with gaseous ammonia will cause defoliation of plants. However, previous attempts to defoliate plants with gaseous ammonia have been characterized by spotty results, an average defoliation of about 75%, and high ammonia usage accompanied by high ammonia loss. In addition to constituting a danger and annoyance to the operator requiring him to use a fresh air mask and protective clothing, the escaping ammonia was a hazard to all animal life. It has been discovered that improper location of ammonia ports is a factor contributing to the poor results obtained when defoliating row crops with ammonia according to the teaching of the prior art. Placing these ports in the mouth section of the elongated contacting zone, as taught by the prior art, permits a considerable portion of the ammonia to be blown away before it enters the body section of the contacting zone. This results in the loss of considerable ammonia. Worse yet, the escaping ammonia may close the stomata of plants in adjacent rows. Although the concentration of the escaping ammonia is too low to produce appreciable defoliation, it is sufficiently high to shock any plants that it contacts into closing their stomata. This renders the shocked plants insensitive to defoliation on subsequent exposure to ammonia in the contacting zone, because, as has been found, ammonia enters the plants through their stomata.

My invention can be illustrated best by reference to the accompanying drawings.

FIGURE 1 presents a top view of my improved elongated contacting zone, or hood. As the hood moves along the crop row, the flared mouth 1 guides the plants into the unit. The plants reach a point of maximum compression at the juncture 2 of the mouth and body sections of the contacting zone; subsequently, on entering the expanded section 3, the compressed plants expand, or open, and are contacted with ammonia which enters the expanded section of the hood via ammonia ports 4 and 5.

FIGURE 2 shows my improved elongated contacting zone 6 mounted on a tractor 7. Plants enter the system via mouth 1 and are contacted with ammonia, in expanded section 3. Ammonia enters this unit through port 4 after being vaporized in ammonia vaporizer 8; alternatively, a mist of liquid ammonia may be fed through the port. Water from tank 9 may be sprayed, from sprayer 10, to dissolve unused ammonia escaping from the hood. Thhe resulting ammonia solution is carried to the ground where it is absorbed and used as fertilizer.

As shown in the drawings, the hood is constructed with a body section of fixed dimensions positioned behind and attached to an expanded section of fixed dimensions, said expanded section being positioned behind and attached to a flared mouth section of fixed dimensions.

Two methods of applying my invention (as described above) give substantially complete defoliation at low ammonia rates without the hazard attendant to the prior art process.

The first of these comprises completely vaporizing liquid ammonia in a portable heat exchanger mounted on the ammonia defoliator and passing the resulting gaseous ammonia into an expanded section of an elongated contacting zone via ports located within the expanded section, which is placed immediately behind the juncture of the mouth and body sections of the hood, as the hood is moved lengthwise along the crop row. The novel feature of my apparatus comprises the expanded section placed immediately behind the mouth section of the hood. I prefer to feed ammonia into the system via ports comprising spargers of the type shown as port 4 in FIGURE 2, and I prefer to locate these spargers in the fore portion of the expanded section of the hood immediately behind the juncture of the mouth and body sections. However, the spargers may be located in any portion of the expanded section. Alternatively, the spargers may be eliminated and ammonia may be fed through one or more ports comprising small openings in the top of the expanded section. Plants in the mouth section serve as a vapor barrier which minimizes the escape of ammonia from the front of the hood. This arrangement provides a means for exposing plants in the body section of the contacting zone to a gas comprising substantially a defoliating atmosphere of ammonia while minimizing both the chance for escaping ammonia to close the stomata of plants in adjacent rows and the entrance of wind into the hood.

The other means for attaining substantially complete defoliation of plants at low ammonia rates, using my invention, comprises passing liquid ammonia under pressure through ports that convert the liquid into an extremely fine mist and delivering this mist into the expanded section of a hood where the liquid is immediately vaporized by heat from the surroundings to produce a gas comprising a defoliating atmosphere of ammonia. This is a very significant discovery, because previous attempts to defoliate row crops by the application of liquid ammonia as a spray of coarse droplets were characterized by extremely poor results. Defoliation was about 40% complete; even this low degree of defoliation was accomplished only by the application of ammonia at a very high rate—well above 200 pounds per acre. This high ammonia usage was accompanied by a high ammonia loss. It has been found that the high ammonia feed rate needed when using liquid ammonia was due to the fact that direct application of drops of liquid ammonia to leaves burns leaves at the points of contact but does not produce appreciable defoliation, and further, that substantially all defoliation obtained when feeding liquid ammonia whether as a fine mist or by the coarse droplets of the prior art, is produced by ammonia gas formed when the liquid vaporizes. As a consequence, only those leaves exposed to a sufficiently high concentration of gaseous ammonia drop off; unexposed or underexposed leaves do not fall.

Ammonia "mist" as used herein, means droplets of ammonia so fine that they evaporate completely to ammonia vapor within one second or less at ambient temperatures. Such droplets have an average diameter less than 1 mm., in contradistinction to droplets of the prior art having an average diameter well in excess of 1 mm., and which may be detected as visible droplets on the leaves of treated plants for several minutes after application, even at temperatures as high as 90° F.

For reasons set forth above, when using the "mist" embodiment, I locate the ammonia ports within the body of the expanded section of the hood. As a preferred embodiment of my invention I have placed the ammonia ports in the expanded section of the hood immediately behind the juncture of the mouth and body sections.

Since ammonia enters plants through the stomata, no defoliation occurs if ammonia is brought into contact with plants when the stomata are closed. This means that the ammonia must be applied during the daylight hours, because the stomata are closed at night. It has also been found that a period of insensitivity to defoliation with ammonia which may last 6–10 hours or longer will be produced by contacting plants with doses of ammonia at rates of about 5–20 pounds per acre which are too low to produce defoliation. In addition, it has been found that water from sprayers placed at the exit end of the elongated contacting zone substantially prevents the escape of unused ammonia into the atmosphere thereby preventing its contacting nearby plants and rendering them insensitive to defoliation.

The rate of ammonia application may be controlled by regulating the amount of ammonia fed to the vaporizer and by controlling the speed with which the elongated contacting zones move along crop rows. It has been found that speeds below about 2 miles per hour are not practical due to the limited number of rows that can be treated in a day, and speeds in excess of about 5 miles per hour tend to damage crops. Hence. I prefer a speed of about 4 miles per hour. Using my invention, I have obtained substantially complete defoliation of plants at ammonia rates ranging from about 40–100 pounds per acre, which is substantially less ammonia than that required to obtain the same results using prior art procedures. There was no tendency to burn or desiccate plant tissues at my higher ammonia rates. Rates below about 30 pounds per acre have failed to produce defoliation.

It has been observed that, when defoliating plants with gaseous ammonia, leaves on plants exiting the contacting zone are considerably lighter green than those of untreated plants. This indicates that ammonia attacks chlorophyll. Within about 15–30 minutes the treated leaves develop a bronze color, and in about 2–6 hours they feel dry when touched. After 8–14 days substantially all of the leaves drop from the plants. This treatment does not kill the plants; new leaves develop in a few weeks.

My invention will be further illustrated by the following examples which are illustrative only and are not intended to limit the scope of the invention.

EXAMPLE I (*Control*)

The equipment used was a conventional ammonia defoliator (Farm Journal, August 1961, page 32. The Farm Journal is published by Farm Journal, Inc., Washington Square, Philadelphia 5, Pa.). The ports for gaseous ammonia were placed in the front of the flared mouth, as is conventional practice, so that the plant in the mouth is thoroughly treated with ammonia vapor before it enters the hood proper. This run was a control to establish that, when using prior art procedures with the low rates of ammonia I have found suitable when using the expanded hood section of my invention, there was not only no improvement over the prior art, but in fact the results were somewhat substandard.

Using this conventional equipment, gaseous ammonia was applied during the sunlight hours at about 105 pounds per acre through ports conventionally located in the flared mouth section of the elongated contacting zone while moving the zone along cotton rows at about 4 miles per hour. Leaves of plants exiting the contacting zone were lighter green than those of untreated plants, and most of the treated leaves had turned bronze within about 30 minutes after being contacted with ammonia. However, only about 72% of the leaves had dropped from the treated plants 14 days after they were exposed to the ammonia.

EXAMPLE II (*My invention*)

This run was similar to that of Example I, but it was modified by using a hood incorporating the expanded section of my invention, and by adding ammonia vapor at about 90 pounds per acre into the foremost portion of the expanded section, through ports located therein, in accordance with my invention. Defoliation of the treated cotton plants was about 99% complete at the end of 14 days. A comparison of this result with the result reported in Example I shows that a very substantial improvement in defoliation results when my improved apparatus is used in place of the conventional device.

The following table summarizes the results of these and similar runs made to compare the efficiency of my improved apparatus with that of a conventional ammonia defoliator.

COTTON DEFOLIATION

| Ammonia Vapor Rate Pounds per acre | Defoliation Efficiency, Percent | |
|---|---|---|
| | Conventional Apparatus | My Improved Apparatus |
| 30 | | 69 |
| 45 | 40 | 79 |
| 60 | 55 | 92 |
| 75 | 69 | 98 |
| 90 | | 99 |
| 105 | 72 | |

These results demonstrate conclusively that a very substantial improvement in defolation was obtained at all ammonia rates tested when my apparatus was used in place of the conventional apparatus.

What is claimed is:

In an ammonia defoliator comprising a vehicular mounted hood with a flared mouth and means for delivering said ammonia through ports to the hood, the improvement comprising constructing said hood with a body section of fixed dimensions positioned behind and attached to an expanded section of fixed dimensions, said expanded section being higher and wider than said body section and being positioned behind and attached to a flared mouth section of fixed dimensions, said ports being positioned in said expanded section immediately behind the juncture of said mouth section and said expanded section.

References Cited by the Examiner

UNITED STATES PATENTS 1,669,435 5/1928 Wheeler ------------ 47—1.7
2,368,275 1/1945 Torley.
2,576,080 11/1951 Tischler.
2,682,728 7/1954 Nisbet --------------- 47—1
2,977,715 4/1961 Lindsay ------------ 47—1 7
2,988,440 6/1961 Bartlett.
3,095,298 6/1963 Fisher.

ABRAHAM G. STONE, *Primary Examiner.*

T. GRAHAM CRAVER, *Examiner.*

UNITED STATES PATENT OFFICE
CERTIFICATE OF CORRECTION

Patent No. 3,238,669　　　　　　　　　　　　　　　　　March 8, 1966

Herman A. Remmert

It is hereby certified that error appears in the above numbered patent requiring correction and that the said Letters Patent should read as corrected below.

In the grant, lines 2 and 3, for "assignor to W. R. Grace & Co., of New York, N. Y., a corporation of Connecticut" read -- assignor, by mesne assignments, to Chevron Research Company, a corporation of Delaware --; line 12, for " W. R. Grace & Co., its successors" read -- Chevron Research Company, its successors --; and in the heading to the printed specification, lines 3 to 5, for "assignor to W. R. Grace & Co., New York, N. Y a corporation of Connecticut" read -- assignor, by mesne assignments, to Chevron Research Company, a corporation of Delaware --.

Signed and sealed this 5th day of September 1967.

(SEAL)
Attest:

ERNEST W. SWIDER　　　　　　　　　　　　　　　　　EDWARD J. BRENNER
Attesting Officer　　　　　　　　　　　　　　　　Commissioner of Patents